Aug. 30, 1927.   E. L. BELLOWS   1,641,020
THERMOMETER CASE
Filed April 21, 1926

Emma L. Bellows
INVENTOR
BY Victor J. Evans
ATTORNEY

WITNESS:

Patented Aug. 30, 1927.

1,641,020

UNITED STATES PATENT OFFICE.

EMMA L. BELLOWS, OF NEW YORK, N. Y.

THERMOMETER CASE.

Application filed April 21, 1926. Serial No. 103,590.

This invention relates to improvements in thermometer cases and particularly to cases for housing clinical mouth thermometers used by doctors and nurses.

The primary object of the invention resides in the provision of a thermometer case adapted to contain a liquid antiseptic such as alcohol and in which the thermometer is immersed when not in use for keeping the same in a sterile and sanitary condition.

Another object of the invention is the provision of a thermometer case in which the antiseptic solution contained therein is prevented from accidentally spilling when the thermometer is removed therefrom, as it will be appreciated that the case is usually set upon a table or other support during the use of the thermometer where it is subject to upsetting.

A further object is to provide a clinical thermometer case which is simple in construction, inexpensive of manufacture and highly efficient for the purpose intended.

With these and other objects in view, the invention resides in certain novel construction and combination and arrangement of parts, the essential features of which are hereinafter fully described, are particularly pointed out in the appended claim, and are illustrated in the accompanying drawing, in which:—

Figure 1:
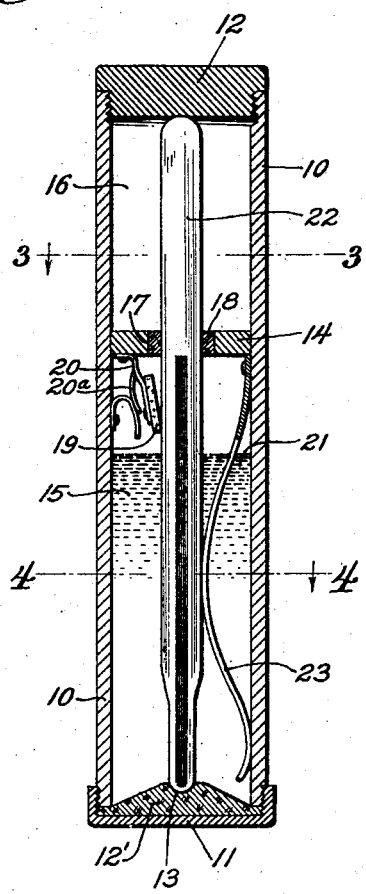
Figure 1 is a vertical longitudinal sectional view through my improved thermometer case showing a thermometer in position therein.
Figure 2:
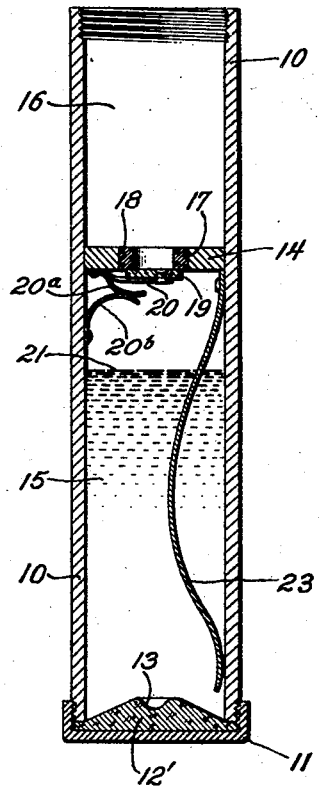
Figure 2 is a similar view but showing the thermometer removed therefrom.
Figure 3:
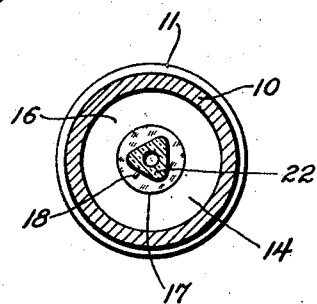
Figure 3 is a horizontal sectional view on the line 3—3 of Figure 1.
Figure 4:
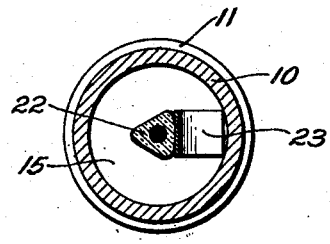
Figure 4 is a similar view on the line 4—4 of Figure 1.

Referring more particularly to the drawing, the reference numeral 10 designates a cylindrical casing which is open at both ends for the attachment of a threaded cap 11 at one end and a closure cap 12 at the opposite end. The end walls of the casing are screw threaded so as to receive the threads on the respective caps 11 and 12. The cap 11 supports a cork pad 12' which is provided with a seat 13 for a purpose to be presently described. A partition 14 is mounted within the casing 10 and divides the casing into a fluid compartment or reservoir 15 and an outer compartment 16. The partition 14 is provided with an opening 17, the walls of which support a yieldable washer 18 constructed of cork or the like.

A valve disk 19 is supported upon a flat spring strip 20 which is riveted to the partition 14, while a tongue 20ª is bent from the strip and is engaged by a flat spring 20ᵇ riveted to the side wall of the casing and which tends to normally force the disk into closing engagement with the opening in the partition, so as to normally seal an antiseptic solution 21 within the reservoir 15. The washer 18, disk 19 and pad 12' are all constructed of cork so as not to be subjected to the action of the solution 21, as it will be appreciated that other yieldable material such as rubber will readily deteriorate if subjected to the action of alcohol or the like.

From the foregoing description, it will be seen that when the clinical thermometer 22 is inserted through the opening in the partition, the walls of the opening, being slightly smaller in diameter than the thermometer, will tend to close about the thermometer and seal the reservoir against leakage through the opening. As the thermometer penetrates the opening, the valve or disk 19 is automatically unseated against the spring tension and as the thermometer is gradually moved toward the seat 13, a yieldable guide member 23 serves to guide the bulb end of the thermometer upon the seat 13. When the thermometer is fully inserted the screw cap 12 is applied and the case may be carried in the pocket in a manner similar to that of an ordinary fountain pen. It might here be mentioned that the pad 12' carried by the cap 11 serves as a gasket for sealing the cap with respect to the casing.

When it is desired to use the thermometer, the cap 12 is removed and the thermometer 22 withdrawn from the case. As the bulb end of the thermometer passes out of the opening in the partition, the spring pressed valve or disk 19 automatically seats to close the opening and seals the reservoir against leakage in the event that the case should be upset, thus preventing the contents of the reservoir from spilling.

For the purpose of washing the casing, or refilling the reservoir with a clean antiseptic, the cap 11 may be removed and the reservoir emptied and refilled.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claim.

What is claimed as new is:—

A thermometer case comprising a tubular casing open at opposite ends, caps removably associated with the ends of said casing, one of said caps provided with a seat for receiving the bulb end of a clinical thermometer, a partition within said casing intermediate the ends of the same for dividing the casing into a pair of chambers and having a yieldable disk mounted therein and provided with an opening for the passage of the thermometer, one of said chambers adapted to receive an antiseptic fluid, and a spring pressed flap valve mounted on said partition and normally closing said opening to prevent the accidental spilling of the fluid, said flap valve automatically moving to an open position upon the insertion of the thermometer through said opening, and a flat bowed spring having one of its ends fixedly connected to said casing and disposed within the fluid chamber and normally disposed in the path of the thermometer for guiding the bulb end of the thermometer to said seat.

In testimony whereof I have affixed my signature.

EMMA L. BELLOWS.